United States Patent
Stanforth et al.

(10) Patent No.: US 7,280,555 B2
(45) Date of Patent: Oct. 9, 2007

(54) SYSTEM AND METHOD EMPLOYING ALGORITHMS AND PROTOCOLS FOR OPTIMIZING CARRIER SENSE MULTIPLE ACCESS (CSMA) PROTOCOLS IN WIRELESS NETWORKS

(75) Inventors: Peter J. Stanforth, Winter Springs, FL (US); Larry W. Koos, Sanford, FL (US); Eric A. Whitehill, Ft. Wayne, IN (US)

(73) Assignee: MeshNetworks, Inc., Maitland, FL (US)

( * ) Notice: Subject to any disclaimer, the term of this patent is extended or adjusted under 35 U.S.C. 154(b) by 1071 days.

(21) Appl. No.: 10/253,422

(22) Filed: Sep. 25, 2002

(65) Prior Publication Data

US 2003/0058886 A1    Mar. 27, 2003

Related U.S. Application Data

(60) Provisional application No. 60/324,277, filed on Sep. 25, 2001.

(51) Int. Cl.
*H04L 12/413* (2006.01)
(52) U.S. Cl. .................. 370/445; 370/458; 370/462; 370/468
(58) Field of Classification Search ............... 370/431, 370/445, 437, 438, 439, 447, 458, 461, 462, 370/468
See application file for complete search history.

(56) References Cited

U.S. PATENT DOCUMENTS

| | | | |
|---|---|---|---|
| 4,494,192 A | 1/1985 | Lew et al. | 365/200 |
| 4,617,656 A | 10/1986 | Kobayashi et al. | 370/74 |
| 4,661,902 A | 4/1987 | Hochsprung et al. | 364/200 |
| 4,736,371 A | 4/1988 | Tejima et al. | 370/95 |
| 4,742,357 A | 5/1988 | Rackley | 342/457 |

(Continued)

FOREIGN PATENT DOCUMENTS

CA    2132180    3/1996

(Continued)

OTHER PUBLICATIONS

Hsiao and Jiang, "A Hand-Shake Protocol for Spread Spectrum Multiple Access Networks", Nov. 27-30, 1989, IEEE Globecom '89, p. 288-292.*

(Continued)

*Primary Examiner*—Hassan Kizou
*Assistant Examiner*—Brian T O'Connor
(74) *Attorney, Agent, or Firm*—Randi L. Karpinia; Joseph J. Buczynski (57) ABSTRACT

A system and method for achieving enhanced CSMA/CA which improves channel availability and quality of service (QoS) in a wireless communications network. The system and method establish channels to enable communication between nodes in a communication network, based on the relationship between the average time length of message data packets and the time lengths of the request to send and clear to send messages. A node of the communication network places a data packet at a location in a queue for retransmission based on a type of information contained in the data packet if the destination node for which the data packet is intended is unable to receive the data packet. The location in the queue is indicative of a duration of time that the node will delay before attempting to resend the data packet to the destination node.

14 Claims, 3 Drawing Sheets

U.S. PATENT DOCUMENTS

| | | | |
|---|---|---|---|
| 4,747,130 A | 5/1988 | Ho | 379/269 |
| 4,774,707 A | 9/1988 | Raychaudhuri | 370/447 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,388,097 A | 2/1995 | Baugher et al. | 370/455 |
| 5,392,450 A | 2/1995 | Nossen | 455/12.1 |
| 5,412,654 A | 5/1995 | Perkins | 370/94.1 |
| 5,424,747 A | 6/1995 | Chazelas et al. | 342/70 |
| 5,457,680 A * | 10/1995 | Kamm et al. | 370/332 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,677,909 A * | 10/1997 | Heide | 370/347 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,852,630 A * | 12/1998 | Langberg et al. | 375/219 |
| 5,857,084 A | 1/1999 | Klein | 395/309 |
| 5,870,350 A | 2/1999 | Bertin et al. | 365/233 |
| 5,870,388 A * | 2/1999 | Yung et al. | 370/260 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,018,516 A | 1/2000 | Packer | |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,073,005 A | 6/2000 | Raith et al. | 455/404 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,363,065 B1 | 3/2002 | Thornton et al. | 370/352 |
| 6,404,756 B1 * | 6/2002 | Whitehill et al. | 370/338 |
| 6,529,520 B1 * | 3/2003 | Lee et al. | 370/442 |
| 6,658,009 B1 * | 12/2003 | Yamashita et al. | 370/395.65 |
| 6,665,311 B2 * | 12/2003 | Kondylis et al. | 370/462 |
| 6,671,260 B1 * | 12/2003 | Engstrand | 370/238 |
| 6,836,469 B1 * | 12/2004 | Wu | 370/322 |
| 6,963,545 B1 * | 11/2005 | Ho | 370/282 |
| 2001/0053699 A1 | 12/2001 | McCrady et al. | 455/513 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| EP | 0973298 A | 1/2000 |
| EP | 0993211 A | 4/2000 |
| EP | 0994604 A | 4/2000 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 01/33770 A | 5/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan dna Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 1th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision--Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throuput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Servie Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

Deng DJ et al., "A Priority Scheme for IEEE 802.11 DCF Access Method," IEICE Transactions on Communications, Institute of Electronics Information and Comm. ENG. Tokyo, JP, vol. E-82-B, No. 1, Jan. 1999, pp. 96-102, XP000927880 ISSN: 0916-8516.

* cited by examiner

SYSTEM AND METHOD EMPLOYING ALGORITHMS AND PROTOCOLS FOR OPTIMIZING CARRIER SENSE MULTIPLE ACCESS (CSMA) PROTOCOLS IN WIRELESS NETWORKS

This application claims benefit under 35 U.S.C. § 119(e) from U.S. provisional patent application Ser. No. 60/324,277, filed on Sep. 25, 2001, the entire contents of which is incorporated herein by reference.

BACKGROUND OF THE INVENTION

1. Field of the Invention

The present invention relates to a system and method employing algorithms and protocols for optimizing carrier sense multiple access with collision avoidance (CSMA/CA) in wireless communications networks. More particularly, the present invention relates to a system and method for providing enhanced CSMA/CA which improves channel availability and quality of service (QoS) in a wireless communications network, such as an ad-hoc wireless communication network.

2. Description of the Related Art

In 1987, Apple was awarded U.S. Pat. No. 4,661,902, the contents of which is incorporated by reference herein, for a CSMA protocol for wired LANs based on a request to send/clear to send (RTS/CTS) exchange (referred to as "AppleTalk"). The CSMA scheme allows multiple devices to share a common resource (i.e., the same physical cable) for communication. Such a scheme is very effective when the communication takes the form of bursts of packets rather than a constant stream of data, such as time division multiplex (TDM) voice.

In 1991, Proxim was awarded U.S. Pat. No. 5,231,634 entitled "Medium Access Protocol for Wireless LANs", the entire content of which is incorporated herein by reference, that describes an enhanced carrier sense multiple access with collision avoidance (CSMA/CA) protocol for a wireless local area network (LAN). The protocol specifically addresses the hidden terminal problem that exists in wireless networks, in which not all terminals are aware of each others existence and the transmissions that each other are making. The protocol also includes an attempt to derive a fairness of access so that the terminals closest to each other do not monopolize the radio link.

The ITT HandHeld Multimedia Terminal (HMT) system as described in U.S. Pat. No. 5,943,322 to Mayor, the entire content of which is incorporated herein by reference, also uses a form of enhanced CSMA/CA protocol which includes the RTS/CTS as defined by Apple. The HMT technology allows each wireless terminal to function as an independent, intelligent router and repeater. Its ad hoc networking provides for a self-organizing and self-healing network structure. The HMT system is a significant improvement over the protocol described in the Proxim patent in a number of ways. Specifically, the HMT system is designed for use by a self forming/self healing network of highly mobile devices in which a simple RTS/CTS is insufficient as described below. Also, the HMT system introduces the concept of three data channels with a common reservation channel to optimize the use of the radio frequency (RF) spectrum. The Proxim protocol does not do this presumably because of the low mobility of the terminals in a wireless LAN and the probability of a large number of interferers being limited by lack of free space propagation. That is, wireless LANs are typically deployed in buildings where walls create natural barriers to RF propagation. However, in the highly mobile open air environment, this assumption is not reasonable.

The Proxim protocol also uses an RTS/CTS and data packet exchange in a common channel. In accordance with this process, no other terminal can use the radio resource while the exchange is occurring or during the back-off period that they define, which results in very low efficiency of the radio resource. As discussed above, the HMT system employs a mechanism with a single shared reservation channel on which all RTS/CTS communication occurs, and three data channels are used for the actual sending of data. As part of the RTS/CTS exchange, the terminals agree on a data channel to use. Accordingly, while a single pair of terminals is transmitting a data packet on one data channel, other terminals can correspond over the reservation channel to set up a packet exchange on another data channel. The result is that the overall efficiency of the network in terms of packets sent per second is much higher.

Although the HMT system operates well for its intended purpose, the system was designed for a military application where all terminals knew about all others (i.e., an all informed network). However, it would be beneficial to employ these techniques in a network in which each terminal does not necessarily have information about each other terminal. Accordingly, a need exists for an improved CSMA/CA protocol suitable for use with such a network.

SUMMARY OF THE INVENTION

It is therefore an object of the present invention to provide an enhanced CSMA/CA protocol suitable for use in an ad-hoc wireless communication network.

It is a further object of the present invention to provide a system and method for achieving enhanced CSMA/CA which improves channel availability and quality of service (QoS) in a wireless communications network, such as an ad-hoc wireless communication network.

These and other objects are substantially achieved by a system and method for establishing channels to enable communication between nodes in a communication network, such as a wireless ad-hoc communication network. The system and method perform the operations of determining an average time length of message data packets being communicated between nodes in the communication network, and determining a time length of a request to send message transmitted by a transmitting node to request clearance to send a message data packet to a destination node, and a time length of a clear to send message transmitted by the destination node to said transmitting node to indicate clearance to send the message data packet. The system and method further perform the operation of establishing a number of data communication channels based on a relationship between the average time length of message data packets and the time lengths of the request to send and clear to send messages. More particularly, the system and method establish a number of data communication channels equal to an integer value determined based on a value representing the average time length of message data packets divided by the sum of a value representing the time length of the request to send message and a value representing the time length of the clear to send message. The system and method further broadcast data indicating the number of data communication channels to the nodes.

These and other objects are further substantially achieved by providing a system and method for controlling a node of a communication network to send a data packet to a destination node in said communication network. The system and method perform the operations of controlling the node to attempt to send the data packet to the destination node; and if the node determines that the destination node has not received the data packet, the node places the data packet at a location in a queue for retransmission based on a type of information contained in the data packet, with the location being indicative of a duration of time that the node will delay before attempting to resend the data packet to the destination node. The duration of time is shorter when the information includes voice data than when the information includes no voice data. Also, while the data packet is in the queue, the system and method control the node to refrain from sending other data packets to the destination node, while also allowing the node to send another data packet to another destination node.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The following describes a network capable of employing the HMT technology in very large commercial applications having a very large number of terminals and servicing very large geographic areas. In doing so, the network employs a number of architectural changes to the basic HMT system as described in U.S. patent application Ser. No. 09/897,790 entitled "Ad Hoc Peer-to-Peer Mobile Radio Access System Interfaced to the PSTN and Cellular Networks", filed on Jun. 29, 2001, the entire content of which is incorporated herein by reference.

Figure 1:
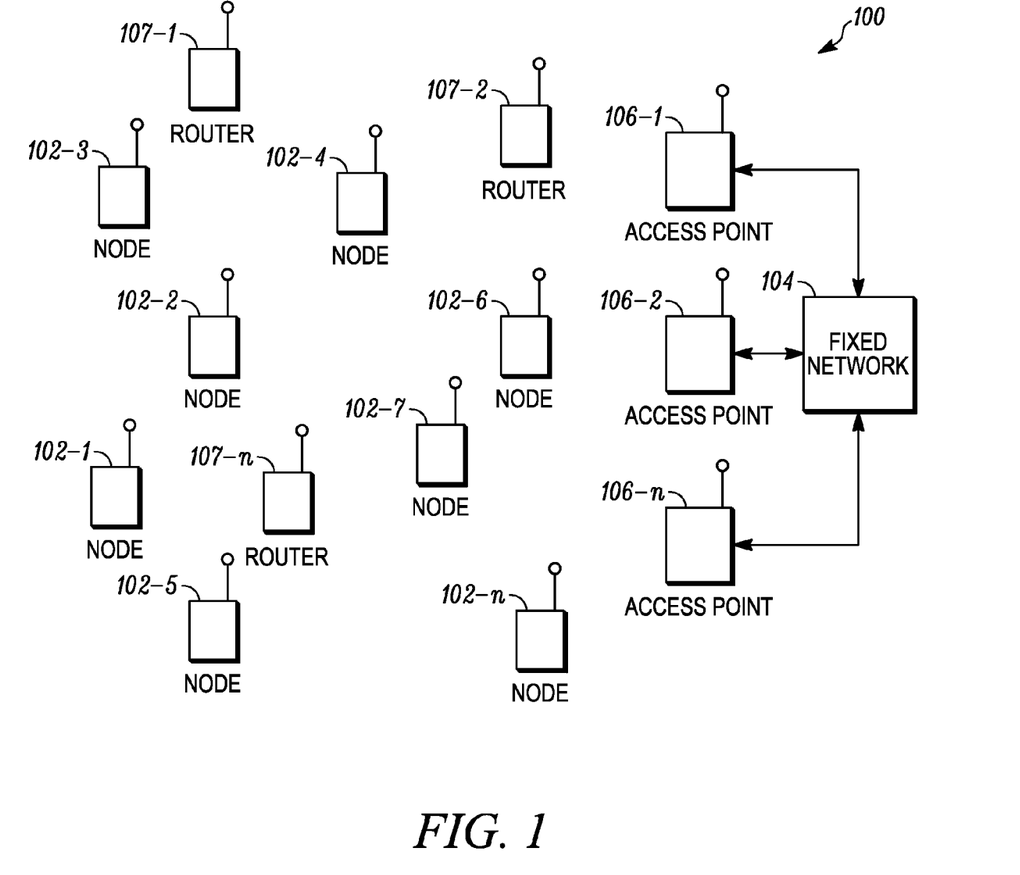
FIG. 1 is a block diagram of an example of an ad-hoc wireless communications network including a plurality of nodes employing an embodiment of the present invention.

FIG. 1 is a block diagram illustrating an example of this type of ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers, to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. patent application Ser. No. 09/897,790 cited above, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, the entire content of both applications being incorporated herein by reference. Each node 102, 106 and 107 shown in FIG. 1 can communicate over plural data channels as well as a network reservation channel. These channels are not limited to any particular architecture or configuration, so long as each node has the ability to access the channels. Furthermore, these channels can exist over any communication medium, such as wire, optical fiber, or wireless (over-the-air), and may employ any suitable transmission protocol.

Figure 2:
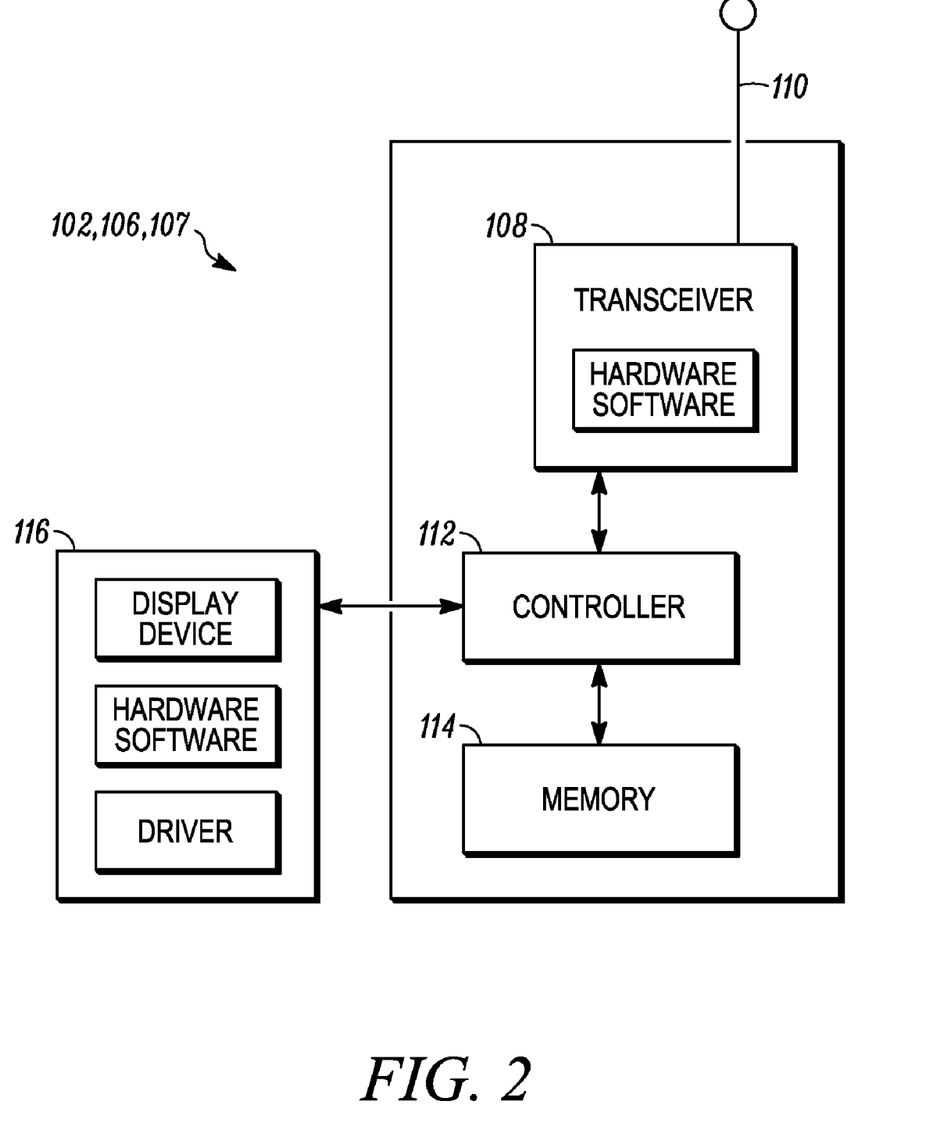
FIG. 2 is a block diagram of an example of a wireless node as shown in FIG. 1.

As shown in FIG. 2, each node 102, 106 and 107 includes at least one transceiver 108 which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 exchange their respective routing information, referred to as routing advertisements or routing table information, with each other via a broadcasting mechanism periodically, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. The subscriber device host 116 can optionally include the appropriate hardware and software to perform transmission control protocol (TCP) and user datagram protocol (UDP). Furthermore, the subscriber device host 116 includes a driver to provide an interface between the subscriber device host 116 and the transceiver 108, in addition to a display device for providing a user display. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As will now be described, each node 102, 106 and 107 can communicate over plural data channels as well as a reservation channel. These channels are not limited to any particular architecture or configuration, so long as each node 102, 106 and 107 has the ability to access the channels. The channels can exist over any communication medium, such as wire, optical fiber, or wireless (over-the-air), and may employ any suitable transmission protocol.

Figure 3:
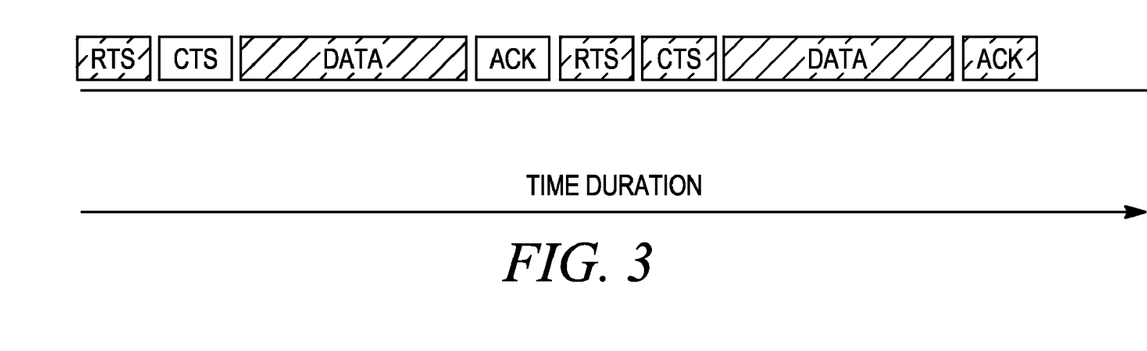
FIG. 3 is a timing diagram illustrating an example of transmissions sent and received by a node in the network shown in FIG. 1 when the node sends data packets to other nodes.

When a node, for example, node 102-1, wishes to transmit a message to another node, for example, node 102-2, node 102-1 transmits a Request-to-Send (RTS) message to node 102-2 in order to notify node 102-2 and other nodes 102 and 106 of its intent to reserve one of the available data channels. The transmitting node 102-1 will then receive a Clear-To-Send (CTS) message from the destination node 102-2 if the destination node 102-2 receives the RTS message. The transmitting node 102-1 then transmits the data in the form of a packet. The transmitting node 102-1 then receives an acknowledgement message (ACK) transmitted from the receiving node 102-2 if the receiving node receives the data packet. FIG. 3 shows a timeline of the messages transmitted and received by the transmitting node 102-1 when it transmits a data packet. Further details of the RTS/CTS exchange and the data packet transmission will now be described with reference to FIG. 4.

Figure 4:
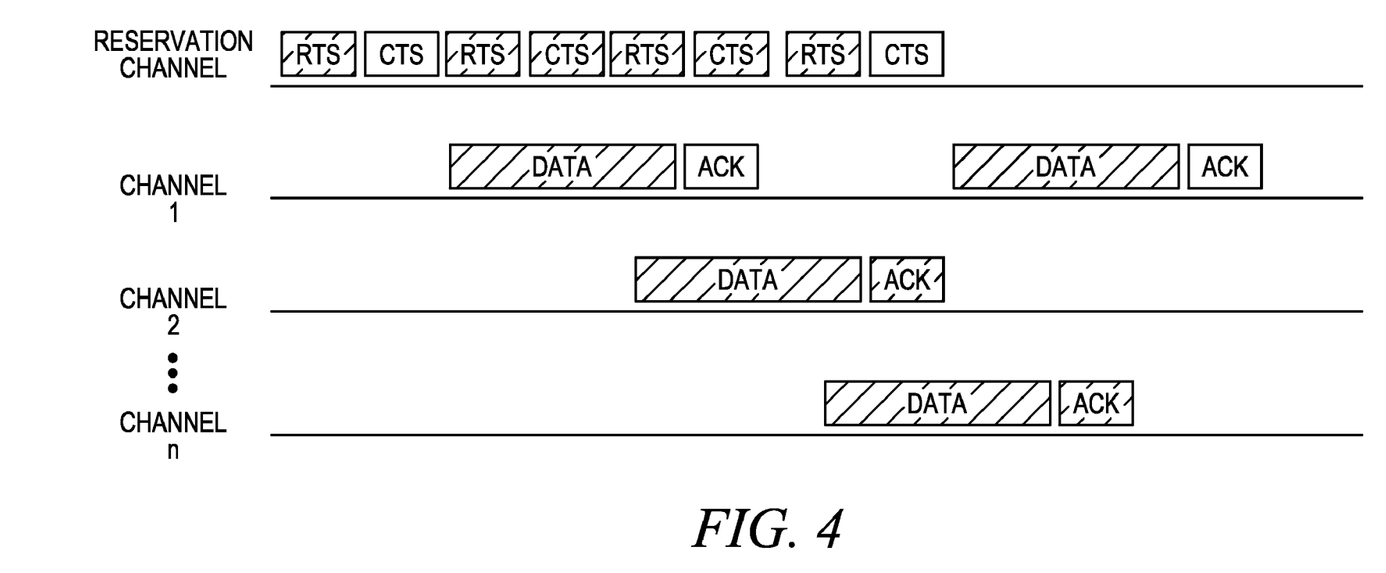
FIG. 4 is a timing diagram illustrating an example of transmissions occurring on a reservation channel and a plurality of data channels between nodes in the network shown in FIG. 1.

As shown in FIG. 4, the RTS message is transmitted by node 102-1 on the reservation channel. When a node 102, 106 or 107 is not engaged in transmission or reception of messages on one of the data channels, its receiver is tuned to the reservation channel. However, when a node 102, 106 or 107 is engaged in the transmission or reception of messages on one of the data channels, the receiver is tuned to that data channel instead of the reservation channel. Consequently, each node 102, 106 and 107 is continuously monitoring the reservation channel with its receiver when it is not transmitting or receiving a message on one of the data channels.

Upon receiving the RTS from node 102-1 on the reservation channel, assuming a data channel is available, node 102-2 replies to node 102-1 with a CTS message on the reservation channel. Upon receiving the CTS message, node 102-1 then transmits the information message to node 102-2 on the available data channel, for example, data channel 1. Because channel access requests are transmitted on the separate reservation channel, another node 102, 106 or 107 can transmit an RTS message shortly after a previous RTS/CTS exchange is completed without waiting for the subsequent information message to be completed.

For example, as further shown in FIG. 4, if node 102-3 wishes to send a message to node 102-4, node 102-3 can transmit an RTS message on the reservation channel after the CTS message from node 102-2 to node 102-1, irrespective of whether the information message being transmitted from node 102-1 to node 102-2 is still being transmitted on data channel 1. Node 102-4 then replies to node 102-3 with a CTS message, and node 102-3 subsequently transmits an information message on another available data channel, such as data channel 2. As seen in FIG. 4, the information message sent from node 102-3 to node 102-4 on data channel 2 can be transmitted simultaneously with the information message sent from node 102-1 to node 102-2 on data channel 1. The message from node 102-3 to node 102-4 is transmitted with essentially no delay resulting from transmission of the long message (i.e., long in time duration) transmitted from node 102-1 to node 102-2. Further details of the RTS/CTS exchange and channel allocation are set forth in U.S. patent application of Eric A. Whitehill et al. entitled "Methods and Apparatus for Coordinating Channel Access to Shared Parallel Data Channels", Ser. No. 09/705,588, filed on Nov. 3, 2000, and in U.S. Patent Application of Eric A. Whitehill et al. entitled "A System and Method for Efficiently Performing Two-Way Ranging to Determine the Location of a Wireless Node in a communications Network", Ser. No. 09/973,799, filed on Oct. 11, 2001, the entire contents of both applications being incorporated herein by reference.

As will now be described, the network 100 employs a methodology which recognizes a direct correlation between the number of data channels and the average size of the data packets. Specifically, if the average size (meaning average length of transmission time) of the data packet gets smaller and approaches the size of an RTS/CTS combination (meaning combined duration of time for the RTS/CTS exchange), the number of data channels that the reservation channel can efficiently support decreases. Conversely, as the average size of the data packet increases relative to the RTS/CTS combination, the number of data channels that can be supported increases. As stated above, FIGS. 3 and 4 are diagrams representing an example of the relationship between the size (duration of transmission time) of the RTS and CTS messages and average sized data packets, and an example of the number of RTS/CTS that occur during the time taken to send an average size packet. As can be appreciated from these figures, the network 100 trends toward packet congestion when all message data packets are small and towards data or payload congestion when all data packets are large.

In the Apple, Proxim and HMT systems the number of data channels was fixed. For the Apple and Proxim systems, the number is one. For the HMT system, the number of data channels is three.

On the contrary, the present network 100 has the capability for the number of data channels to be between 1 and n (where n represents an integer value of the length of time to transmit an average size message data packet divided by the length of time to perform an RTS+CTS message exchange). For purposes of this explanation, the length of time to transmit an average size message data packet will be represented in bytes, and the length of time to perform an RTS+CTS exchange will also be represented in bytes. It should be noted that the transmission rate on the reservation channel over which the RTS/CTS message exchange occurs is typically lower than the transmission rate on a data channel over which the data packet is transmitted. However, this is taken into account for purposes of this example when representing the time lengths of the messages as a number of bytes. For example, if the average size of a message data packet is 1200 bytes (meaning the duration of transmission time is equal to the length of time necessary to send 1200 bytes over a data channel, which will be referred to in the shorthand form "time length" of the message data packet) and the length of an RTS+CTS message exchange is 200 bytes (meaning the duration of transmission time to perform the RTS/CTS exchange on the reservation channel, when modified to take into account the slower transmission rate of the reservation channel, is equivalent to the length of time necessary to send 200 bytes over a data channel, which will be referred to as the "time length" of the RTX and CTS messages), then n would equal six. Likewise, if the average size (time length) of a message data packet is 1500 bytes and the time length of an RTS+CTS exchange is 200 bytes, then n would equal seven. The actual number of data channels in use will be a system parameter that is broadcast amongst the nodes 102, 106 and 107. However, it is also noted that the amount of available RF spectrum may limit the options to something less than the ideal number. As described in U.S. patent application Ser. No. 09/897,790 referenced above, a mobile Internet switching center (MiSC), as well as IAPs 106 in the network 100 can include software which enable them to analyze the packets that are transmitted by the nodes 102, 106 and 107 and determine an average packet size. This allows the network 100 to dynamically change the number of channels that are in use almost in real time.

System Awareness in the RTS/CTS

In the network 100 according to an embodiment of the present invention, a common reservation channel shared by all nodes 102, 106 and 107 allows the network 100 to do system level configuration, coordination and provisioning. When idle, all nodes 102, 106 and 107 are listening on the reservation channel. The primary reason is to be able to gauge the level of utilization, when an application wants to send a packet, and to be ready to receive a packet from another node 102, 106 or 107. By partitioning out a small amount of the bandwidth on the reservation channel, the nodes 102, 106 and 107 can share information that is pertinent to all of them as described above. One example of this information is the number of data channels in use. Another is the location of the data channels if the available spectrum is not contiguous. Information about the identity and operation of the network 100 can be broadcast from the MiSC/IAP so that all nodes 102, 106 and 107 can cooperate in the most efficient and effective manner. It is expected that this commonly known information will assist in the overall efficiency of the network 100 in a number of additional areas as well.

Intelligent Random Backoff and Configurable Random Backoff

The Proxim system employs a random back off scheme to increase fairness of access which is based on a random allocation of a timeslot so that, statistically, all nodes 102, 106 and 107 have an equal chance of being next in the queue. For a packet data system, this is a simple and elegant solution. However, the network 100 according to an embodiment of the present invention also provides quality of service (QOS) capability that allows the network 100 to support real time services such as voice as well as traditional data services. In such a network 100, all terminals (e.g., mobile nodes 102) are created equal or essentially equal, but all packets are not. Accordingly, a different type of random back off system is needed so that the voice packets that cannot tolerate latency (i.e., delay) are not unreasonably impeded. Hence, the implementation of this aspect of the network 100 according to an embodiment of the present invention is as follows:

When the Link Layer of a node (e.g., a mobile node 102) receives a response from the media access control (MAC) that it failed to send a packet, the controller 112 of the node attempting to transmit the packet will place the packet in a retransmission queue in the memory 114, for example, of the node. There are multiple possible reasons for failure, but the most prevalent is RTS collision.

Two events occur at the node attempting to transmit when the packet is placed in a queue. First, the destination of the packet is blocked. Thus, the controller 112 of the node will also put any other packets for that destination into a queue. This allows the node to continue to send data packets to other destinations, on other data channels, while waiting for the appropriate time to try retransmission to the blocked destination. Second, the amount of time that the node will wait is dependent on the type of packet being transmitted. In simple terms, the node will wait a short time for a low latency QOS packet (such as a voice packet) and a longer time for a best effort data packet. The methodology in the network 100 expands on the basic algorithm by using the performance measurements the network is taking to fine tune the back off algorithm and also allow for the back off to be configured manually or automatically by the network 100.

Although only a few exemplary embodiments of the present invention have been described in detail above, those skilled in the art will readily appreciate that many modifications are possible in the exemplary embodiments without materially departing from the novel teachings and advantages of the invention.

What is claimed is:

1. A method for establishing channels to enable communication between nodes in a communication network, the method comprising:

determining an average length of time to transmit message data packets between a transmitting node and a destination node in said communication network;

determining a length of time to transmit a request to send message from said transmitting node to said destination node to request clearance to send a said message data packet to said destination node, and a length of time to transmit a clear to send message from said destination node to said transmitting node to indicate clearance to send said message data packet; and establishing a quantity of data communication channels, wherein the quantity is determined by a relationship between said average length of time to transmit message data packets and said lengths of time to transmit said request to send and clear to send messages on a reservation channel.

2. A method as claimed in claim 1, wherein:

said establishing establishes said quantity of data communication channels equal to an integer value determined based on a value representing said average length of time of message data packets divided by the sum of a value representing said length of time of said request to send message and a value representing said length of time of said clear to send message.

3. A method as claimed in claim 1, further comprising:

broadcasting data indicating said quantity of data communication channels to said nodes.

4. A method as claimed in claim 1, wherein:

said network includes a wireless ad-hoc communication network; and both of said determining steps and said establishing step are performed in relation to said wireless ad-hoc communication network.

5. A system for establishing channels to enable communication between nodes in a communication network, the system comprising:

a component for determining an average length of time to transmit message data packets between a transmitting node and a destination node in said communication network; and said component further for determining a length of time for transmitting a request to send message from said transmitting node to said destination node to request clearance to send a said message data packet to said destination node, and a length of time to transmit a clear to send message from said destination node to said transmitting node to indicate clearance to send said message data packet, and to determine a quantity of data communication channels to establish based on a relationship between said average length of time to transmit message data packets and said lengths of time to transmit each of said request to send and clear to send messages on a reservation channel.

6. A system as claimed in claim 5, wherein:
said component establishes said quantity of data communication channels equal to an integer value determined based on a value representing said average length of time for transmitting message data packets divided by the sum of a value representing said length of time to transmit said request to send message and a value representing said length of time to transmit said clear to send message.

7. A system as claimed in claim 5, wherein:
said component further broadcasts data indicating said quantity of data communication channels to said nodes.

8. A system as claimed in claim 5, wherein:
said network includes a wireless ad-hoc communication network; and
said component communicates within said wireless ad-hoc communication network.

9. A system as claimed in claim 5, wherein:
said component includes an access point of said network, adapted to provide at least some of said nodes with access to other portions of said network or another network.

10. A system as claimed in claim 5, wherein:
said component includes a mobile Internet switching center associated with said network.

11. A computer-readable medium of instructions for controlling a component for establishing channels to enable communication between nodes in a communication network, the computer-readable medium of instructions comprising:
a first set of instructions for controlling said component to determine an average length of time to transmit message data packets between a transmitting node and a destination node in said communication network;
a second set of instructions for controlling said component to determine a length of time to transmit a request to send message from said transmitting node to said destination node to request clearance to send a said message data packet to said destination node, and a length of time to transmit a clear to send message from said destination node to said transmitting node to indicate clearance to send said message data packet; and
a third set of instructions for controlling said component to determine a quantity of data communication channels to establish based on a relationship between said average length of time to transmit message data packets and each of said lengths of time to transmit said request to send and clear to send messages on a reservation channel.

12. A computer-readable medium of instructions as claimed in claim 11, wherein:
said third set of instructions controls said component to establish said quantity of data communication channels equal to an integer value determined based on a value representing said average length of time to transmit message data packets divided by the sum of a value representing said length of time to transmit said request to send message and a value representing said length of time to transmit said clear to send message.

13. A computer-readable medium of instructions as claimed in claim 11, further comprising:
a fourth set of instructions for controlling said component to broadcast data indicating said quantity of data communication channels to said nodes.

14. A computer-readable medium of instructions as claimed in claim 11, wherein:
said network includes a wireless ad-hoc communication network; and
said first, second and third set of instructions control said component which is associated with said wireless ad-hoc communication network.

* * * * *